Dec. 18, 1956 J. L. JENSEN 2,774,878
OSCILLATORS
Filed Aug. 29, 1955
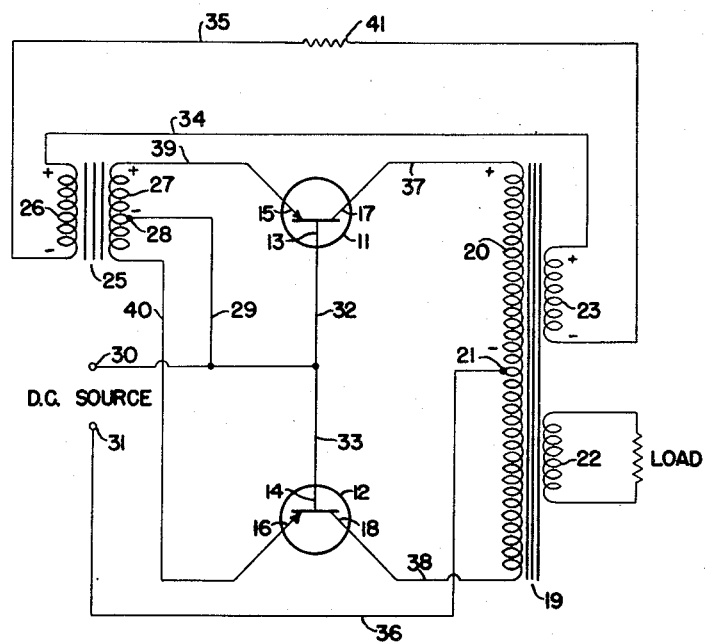
*INVENTOR.*
JAMES L. JENSEN
BY Frederick E. Lange
*ATTORNEY*

United States Patent Office 2,774,878
Patented Dec. 18, 1956

2,774,878

OSCILLATORS

James Lee Jensen, St. Louis Park, Minn., assignor to Minneapolis-Honeywell Regulator Company, Minneapolis, Minn., a corporation of Delaware Application August 29, 1955, Serial No. 530,981

10 Claims. (Cl. 250—36)

This invention relates generally to oscillator circuits, and more particularly to oscillator circuits wherein a saturable core transformer is used as the controlling element causing the circuits to be oscillatory.

The use of saturable core transformers as controlling means is well known. Their use in oscillator circuits as the oscillation controlling element, however, has been quite limited. The prior art existing utilizes the output transformer as having the saturable core which is the most obvious method. There are, however, some undesirable drawbacks connected with such a configuration. One of the main drawbacks is the relatively high power losses incurred in the transformer core when sufficient current is passed through it in order to cause such saturation. Another drawback is the high transient voltages incurred due to the large current in the transformer windings at the switching instant.

It is accordingly an object of this invention to prevent large power losses and high transient voltages in an oscillatory circuit utilizing a saturable core transformer as the control element causing oscillation.

Another object of the invention is to provide an efficient circuit for converting a direct current to an alternating current.

These and other objects and advantages of the invention will be understood from the following description when read in connection with the accompanying drawing in which the single figure is a circuit diagram of a transistor oscillator embodying the invention.

Referring now to the drawing, there is shown a transistor 11, having a base electrode 13, an emitter electrode 15, and a collector electrode 17; also, another transistor 12, having a base electrode 14, an emitter electrode 16, and a collector electrode 18. A transformer 19 is shown, having a center tap 21 on a primary winding 20, and two secondary winding 22 and 23. Center tap 21 is connected by a conductor 36 to a negative terminal 31 of a suitable source of direct current potential. Primary winding 20 is connected to collector electrodes 17 and 18 by conductors 37 and 38 respectively. Output secondary winding 22 is connected to a suitable load device, here shown as an impedance. Secondary winding 23 serves as a voltage feedback source and is connected by conductors 34 and 35 to the primary winding 26 of a second transformer 25. A current limiting resistor 41 is included in conductor 35. A secondary winding 27 of transformer 25 has its terminals connected by conductors 39 and 40 to emitter electrodes 15 and 16 respectively. A center tap 28 on winding 27 is connected by a conductor 29 to a positive terminal 30 of the D. C. source and by conductors 32 and 33 to base electrodes 13 and 14, respectively.

In order to understand the operation of the oscillator, let it be assumed that initially transistor 11, due to a slight dissimilarity from transistor 12, has a slightly greater leakage current through it from base 13 to collector 17 than does transistor 12 from its base 14 to collector 18. The leakage current flows as a result of the potential existing due to the D. C. source voltage being impressed across the base and collector electrodes. The positive terminal 30 of the D. C. source is connected by conductors 32 and 33 to base electrodes 13 and 14 respectively. The negative terminal 31 is connected by conductor 36 and through winding 20 to collector electrodes 17 and 18 by conductors 37 and 38 respectively. The aforementioned dissimilarity causes the greater leakage current through transistor 11 and this causes a voltage to be produced in primary winding 20 such that the upper terminal is positive with respect to the center tap terminal as indicated by legends on the drawing. This in turn results in a voltage being induced in secondary winding 23. This voltage is fed back to primary winding 26 of transformer 25, causing a voltage to be induced in the winding 27. The windings are so arranged that the polarity of this voltage is such that the upper terminal is positive with respect to the lower terminal. It will be seen that the voltage induced is such that emitter 15 of transistor 11 is now at a slightly more positive potential relative to base 13 than before, and that emitter 16 of transistor 12 is now more negative with respect to base 14. This will cause a greater current to flow through transistor 11 from emitter 15 to collector 17 and will tend to cutoff any current flowing through transistor 12. The induced voltages will be increased in magnitude, furthering the condition and transistor 11 will become fully conductive while transistor 12 is driven further into cutoff. The action leading to the full conduction of transistor 11 and the cutoff of transistor 12, while described as cumulative, happens almost instantaneously upon connecting the direct current source to the circuit; the time required being relatively short compared to the half-cycle.

A current path, with transistor 11 conducting and transistor 12 cutoff, may be traced from the positive terminal 30 of the D. C. source through conductor 29 to center tap 28 and the upper half of winding 27 to emitter 15, through transistor 11, out collector 17 and through winding 20 to center tap 21, and via conductor 36 to the negative terminal 31 of the D. C. source. Secondary winding 23 serves as a source for a feedback voltage to transformer 25, such feedback operating as described above.

Operation will continue with transistor 11 conducting and transistor 12 cutoff, until a period of time has elapsed such that the core of transformer 25 has become saturated due to the feedback voltage impressed upon it. The impedance of the transformer is effectively reduced and greater current would flow through its windings, however, current limiting resistor 41 prevents any great increase in current through the transformer. Thus, since the effective transformer impedance has been lessened without any substantial increase in current therethrough, the transformer voltage reduces and the driving voltage across emitter 15 to base 13 falls. This reduces the current through transistor 11 and through output transformer 19. The flux change of transformer 19 is such as to now cause a voltage of the opposite polarity to be produced in its windings. This voltage now fed back to transformer 25 causes transistor 11 to be driven to cutoff and transistor 12 to become conductive. This state now continues until the core of transformer 25 saturates in the reverse direction completing a second half-cycle, whereupon the initial state again prevails and the cycle repeats. It is to be understood, that in accordance with the main premise of this invention, transformer 25 saturates considerably before saturation is approached in transformer 19. In this manner large core losses and high transients are avoided in the output transformer. The core losses in transformer 25 are relatively insignificant to the circuit as a whole. It will be appreciated that a saturating autotransformer may be used in place of transformer 25 if desired.

Secondary winding 23 provides a feedback path to the transistors through the transformer 25. It also serves as a control of the voltage fed back to transformer 25. Varying the number of turns of winding 23 will vary the voltage subsequently fed back to transformer 25. This will vary the time required to saturate the core. Varying the construction of the core will, of course, also vary the saturation flux. These two factors, turns of winding 23 relative to winding 20 and construction of the core of transformer 25, afford a means of controlling the frequency of oscillation and to some extent the shape of the output waveform.

In describing the preferred embodiment of my invention I have shown an illustrative circuit utilizing transistors. It is to be understood that vacuum tubes could be used equally as well. Further, I have shown a circuit using two transistors; however, more than two transistors or vacuum tubes or even one transistor or vacuum tube might be used, all of these variations utilizing a second transformer means having an easily saturable core as the oscillation causing element. These and many other variations will be apparent to those skilled in the art without departing from the spirit and scope of the invention as defined in the appended claims.

What is claimed is:

1. Electronic apparatus for converting a direct current to an alternating current, said apparatus comprising: electronic amplifying means, said amplifying means having control elements for varying the flow of current through said amplifying means; means for connecting the output circuit of said electronic amplifying means to a direct current source; means for connecting said output circuit to a load device; feedback means including inductive coupling means having its input connected to said output circuit by means additional to said means for connecting said output circuit to a load device and having its output connected to the control elements thereof, said feedback means being connected in such a manner as to initially tend to increase the flow of current through the output circuit of said electronic amplifying means and hence to further increase the signal applied to said control elements; said inductive coupling means of the feedback meanas including a saturable core for limiting the amount of signal transmitted to said control elements so that upon such limiting value being reached, the inductive coupling means is effective to decrease the signal transmitted to said control elements to result in said electronic amplifying means again becoming nonconductive.

2. An electronic apparatus for generating a square wave alternating current from a unidirectional source of voltage, said apparatus comprising: an electronic device having output terminals and a control element for varying the flow of current between said output terminals, means for connecting the output terminals of said electronic control device to a unidirectional source of voltage, to form an output circuit for said device, means for connecting said output circuit to a load device; feedback means including inductive coupling means having its input connected to said output circuit by means additional to said means for connecting said output circuit to a load device and having its output connected to the control element thereof, said feedback means being connected in such a manner as to initially tend to increase the flow of current through the output circuit of said electronic device and hence to further increase the signal applied to said control element, said inductive coupling means of the feedback means including a saturable core for limiting the amount of signal transmitted to said control element so that upon said limiting value being reached, the inductive coupling means is effective to decrease the signal transmitted to said control element to result in said electronic conductive device again becoming nonconductive.

3. An oscillator comprising a pair of semiconductor devices, each device having a plurality of electrodes including an emitter, a collector and a base electrode, first and second transformers, said first transformer having a primary winding and a plurality of secondary windings, said primary winding being connected across said collector electrodes, one of said secondary windings being connected to a load device, another of said secondary windings being connected to a primary winding of said second transformer, said second transformer being constructed so that its core saturates easily and in operation saturates before the core of said first transformer, a second winding of said second transformer having its opposite ends connected to said emitter electrodes; and a source of potential connected to said second transformer, said base electrodes, and to said first transformer.

4. An oscillator comprising transistor means, said means having input and output terminals; a first and a second transformer, said first transformer having a primary winding and a plurality of secondary windings; said primary winding being connected across said output terminals, one of said secondary windings being connected to a load device, and means connecting another of said secondary windings to a primary winding of said second transformer, said second transformer being constructed so that its core saturates easily and in operation saturates before the core of said first transformer, a second winding of said second transformer having its opposite ends connected to said input terminals; and a source of potential connected to said second transformer, said input terminals, and to said first transformer.

5. An oscillation generator comprising a plurality of electronic amplifying devices; a source of potential; first and second transformer means; circuit means, including said first transformer means, connecting said potential source to said electronic amplifying devices; and a voltage feedback path connecting said first transformer means to said second transformer means; said second transformer means being so designed that its core saturates, in circuit operation, before the core of said first transformer means; and said second transformer means being connected to said electronic amplifying devices in such a manner as to control the current therethrough.

6. A transistor oscillator circuit comprising a pair of alternately conducting transistors, each having an emitter, a collector, and a base electrode; and first and second transformers; said first transformer having a primary and two secondary windings, said primary winding being connected across said collector electrodes, said primary winding also having a center tap connected to one terminal of a direct current source of potential, the first of said secondary windings being connected to a load impedance, the second of said secondary windings being connected to the primary winding of said second transformer, such connection furnishing a current feedback path through said second transformer to said base and emitter electrodes, said second transformer being designed so that in circuit operation, its core saturates before the core of said first transformer; a secondary winding of said second transformer having its opposite ends connected to said emitter electrodes and having a center tap connected to said base electrodes and to the other terminal of said potential source; said second transformer operating in response to its saturation state to control the bias on said emitter electrodes so as to alternately bias each transistor to a substantially cut off condition thereby producing an alternating current in said first transformer, the first of said secondary windings thereof subsequently delivering such alternating current to said load impedance.

7. An oscillator circuit comprising: a plurality of semiconductor devices, said devices having input and output terminals; first and second transformer means, said first transformer means being connected to said output terminals; circuit means interconnecting said first and second transformer means, said second transformer means being designed so that it saturates before said first transformer means; and further circuit means connecting said second transformer means to the input terminals of said semiconductor devices in such a manner as to control the current through said semiconductor devices.

8. An oscillator circuit comprising semiconductor means, said means having input and output terminals; first and second transformer means; said first transformer means being connected to said output terminals; circuit means interconnecting said first and second transformer means, said second transformer means being designed so that it saturates before said first transformer means; and further circuit means connecting said second transformer means to the input terminals of said semiconductor means in such a manner as to control the current through said semiconductor means.

9. A transistor converter for converting a direct current potential to an alternating current potential comprising: a pair of transistors, each of said transistors having input and output electrodes; output transformer means; a source of direct current potential; means, including said transformer means, connecting said source of potential to said output electrodes; and feedback means including saturable impedance means connected from said transformer means to the input electrodes of said transistors, said saturable feedback means controlling the bias to said transistors so that the transistors are alternately made conductive.

10. An oscillator comprising: at least two transistors; a source of potential; an output transformer and a second transformer, said output transformer being connected to said transistors and to one terminal of said potential source, said output transformer having a secondary winding connected to said second transformer, said second transformer being designed so that its core saturates before the core of said output transformer; circuit means connecting said second transformer to the other terminal of said potential source; and further circuit means connecting said second transformer to said transistors in such a manner to alternately bias the transistors to substantially cut off and relatively high states of conduction.

No references cited.